US008241775B2

(12) United States Patent
Wang

(10) Patent No.: US 8,241,775 B2
(45) Date of Patent: Aug. 14, 2012

(54) FIXING MECHANISM AND ELECTRONIC DEVICE USING SAME

(75) Inventor: Shao-Ying Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 384 days.

(21) Appl. No.: 12/582,848

(22) Filed: Oct. 21, 2009

(65) Prior Publication Data

US 2011/0020683 A1 Jan. 27, 2011

(30) Foreign Application Priority Data

Jul. 27, 2009 (CN) .......................... 2009 1 0304879

(51) Int. Cl.
*H01M 2/04* (2006.01)
*H01M 2/10* (2006.01)

(52) U.S. Cl. ........................... 429/97; 429/100; 429/163

(58) Field of Classification Search .................... 429/96, 429/97, 100, 79, 163; 361/679.37, 729; 392/413
See application file for complete search history.

(56) References Cited

U.S. PATENT DOCUMENTS

| | | | | |
|---|---|---|---|---|
| 3,223,826 | A * | 12/1965 | Macaluso, Jr. | 392/413 |
| 3,745,049 | A * | 7/1973 | Kaye | 429/97 |
| 5,153,817 | A * | 10/1992 | Hosoi et al. | 361/679.37 |
| 6,730,432 | B1 * | 5/2004 | Grosfeld et al. | 429/97 |
| 2003/0013013 | A1 * | 1/2003 | Nakamura | 429/159 |
| 2007/0003825 | A1 * | 1/2007 | Touchton et al. | 429/97 |

* cited by examiner

*Primary Examiner* — Jonathan Crepeau
*Assistant Examiner* — Kenneth Douyette
(74) *Attorney, Agent, or Firm* — Altis Law Group, Inc.

(57) ABSTRACT

A fixing mechanism for fixing a battery in a sleeve with a battery cover includes a fixing member fixed to the battery cover and two fixing positions positioned on opposite inner surfaces of the sleeve. Each fixing position includes two latch grooves. The fixing member forms two elastic latch portions, each latch portion forms two latch protrusion corresponding to the latch grooves. The latch protrusions and the latch grooves both include a sliding surface and two abutting surfaces. The latch protrusions engage in or disengage from the latch grooves, thus the fixing member can be fixed in or detached from the sleeve. An electronic device using the fixing mechanism is also provided.

9 Claims, 3 Drawing Sheets

20
322
32
321
3211
3212
30
25
31
311
315
212
3131
3132
313
312
213
21
211
231
232
23

FIXING MECHANISM AND ELECTRONIC DEVICE USING SAME

BACKGROUND

1. Technical Field

The present disclosure generally relates to fixing mechanisms for electronic devices, and particularly, to a fixing mechanism for fixing a battery cover to a sleeve and an electronic device using the same.

2. Description of Related Art

An electronic device, such as a wireless keyboard, a wireless touchpad, a remote control, and the like, usually includes a battery to provide electrical power. For installation or removal of the battery, a detachable battery cover is often utilized.

A commonly used electronic device includes a battery, a sleeve, and a detachable battery cover. The sleeve defines a chamber to receive the battery. The battery cover includes a cover plate and a body portion extending from the cover plate. The sleeve further defines an inner screw threaded in an inner surface of the chamber adjacent to the opening end. The body portion of the battery cover defines an outer screw threaded corresponding to the inner screw, such that the body portion of the battery cover may be screwed into the opening end of the sleeve. However, it is relatively inconvenient to assemble or disassemble the battery cover to or from the sleeve.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION OF THE EMBODIMENTS

Figure 1:
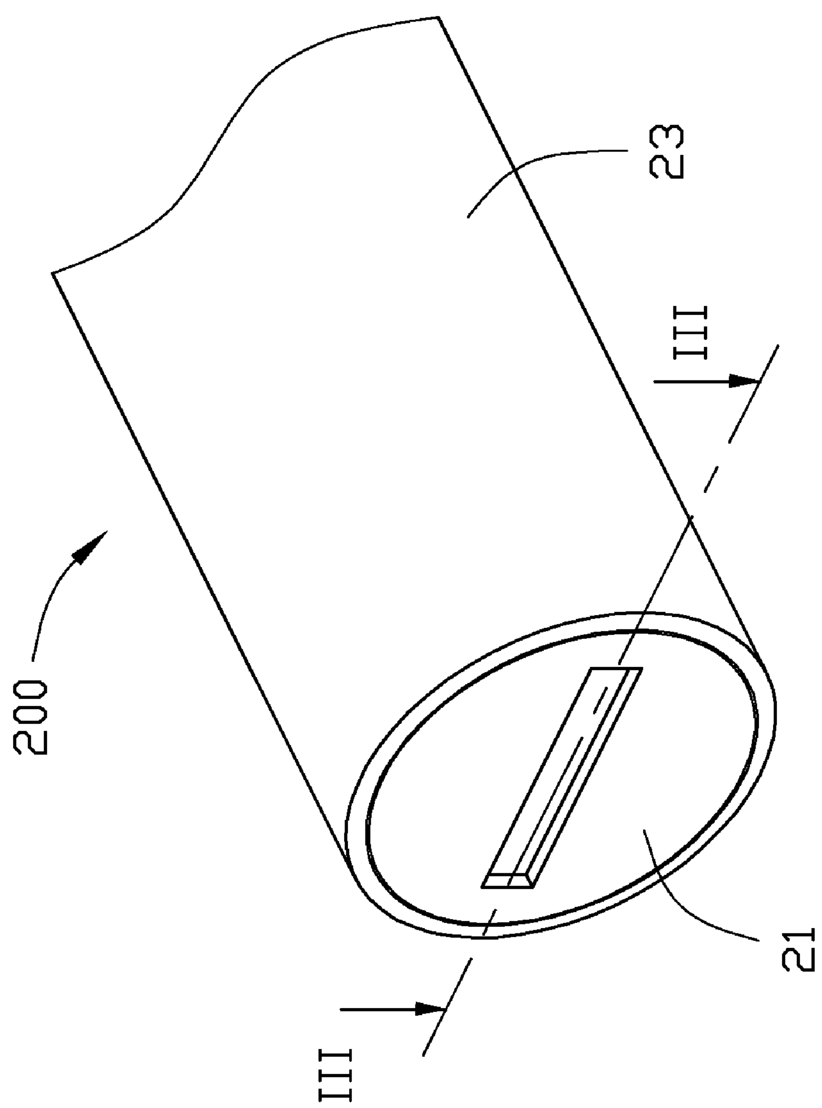
FIG. 1 is a partial isometric view of an embodiment of an electronic device.
Figure 2:
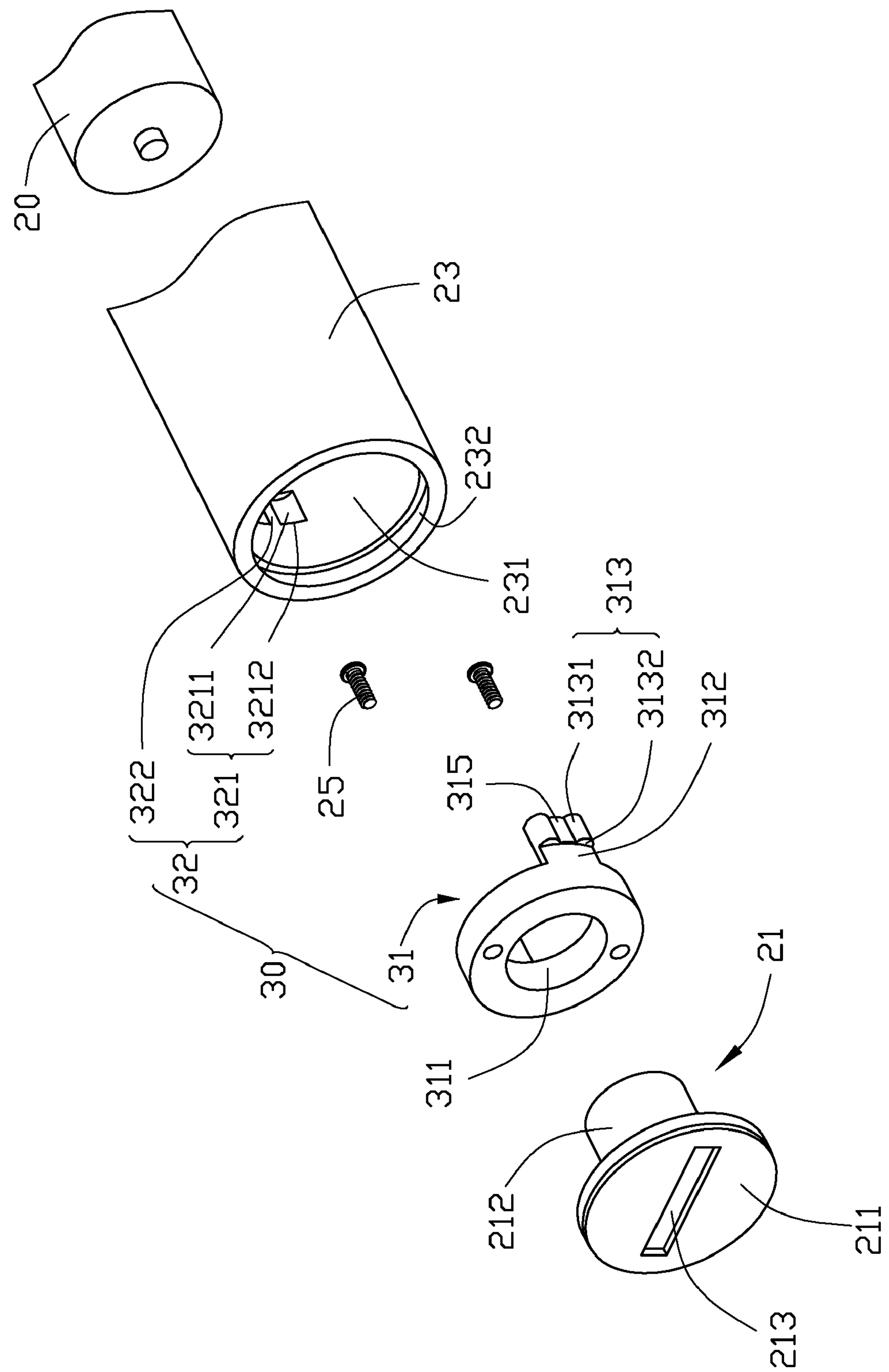
FIG. 2 is an exploded, isometric view of the electronic device in FIG. 1.

Referring to FIGS. 1 and 2, an electronic device 200 includes a battery 20, a battery cover 21, a fixing mechanism 30, and a sleeve 23. The fixing mechanism 30 fixes the battery 20 in the sleeve 23 with the battery cover 21. The electronic device 200 can be a wireless keyboard, a wireless touchpad, a remote control, or other device utilizing an installed battery to supply power thereto.

The battery cover 21 includes a cover portion 211 and an electric portion 212 extending substantially perpendicularly from a first surface of the cover portion 211. The cover portion 211 is a substantially circular plate. The electric portion 212 is substantially cylindrical. The cover portion 211 defines an operating slot 213 in a second surface opposite to the electric portion 212 to facilitate assembly or removal of the battery cover 21 using a screwdriver. The operating slot 213 may alternatively be replaced by an operating protrusion.

The sleeve 23 is substantially cylindrical. The sleeve 23 defines a chamber 231 to receive the battery 20. The sleeve 23 defines a receiving groove 232 in an inner surface adjacent to an opening end of the sleeve 23. The receiving groove 232 is a substantially circular groove receiving the cover portion 211.

The fixing mechanism 30 includes a fixing member 31 and two fixing portions 32. The fixing member 31 can be fixed to the battery cover 21 by two fasteners 25. The fixing portions 32 are positioned on opposite inner surfaces of the sleeve 23 adjacent to the receiving groove 232.

The fixing member 31 is a substantially circular ring, and defines a through hole 311 in a center portion thereof. The diameter of the fixing member 31 is slightly smaller than a diameter of the chamber 231, so that the fixing member 31 can be received in the chamber 231. The diameter of the through hole 311 is slightly larger than a diameter of the electric portion 212 of the battery cover 21, so that the electric portion 212 can be received in the through hole 311. The fixing member 31 forms two latch portions 312 on opposite sides thereof. Each latch portion 312 extends substantially parallel to the center axis of the fixing member 31 and includes two latch protrusions 313 formed on an end thereof, and a positioning groove 315 defined between the two latch protrusions 313. Each latch protrusion 313 is substantially semi-cylindrical, and has a curved sliding surface 3131 and two substantially flat abutting surfaces 3132 formed on opposite ends thereof. The latch portions 312 may be made of metal or plastic, and can deform elastically.

Each fixing portion 32 includes two latch grooves 321 corresponding to the latch protrusions 313, and a positioning protrusion 322 formed between the two latch grooves 321. Each latch groove 321 is also substantially semi-cylindrical, and has a curved sliding surface 3211 and two substantially flat abutting surfaces 3212.

Figure 3:
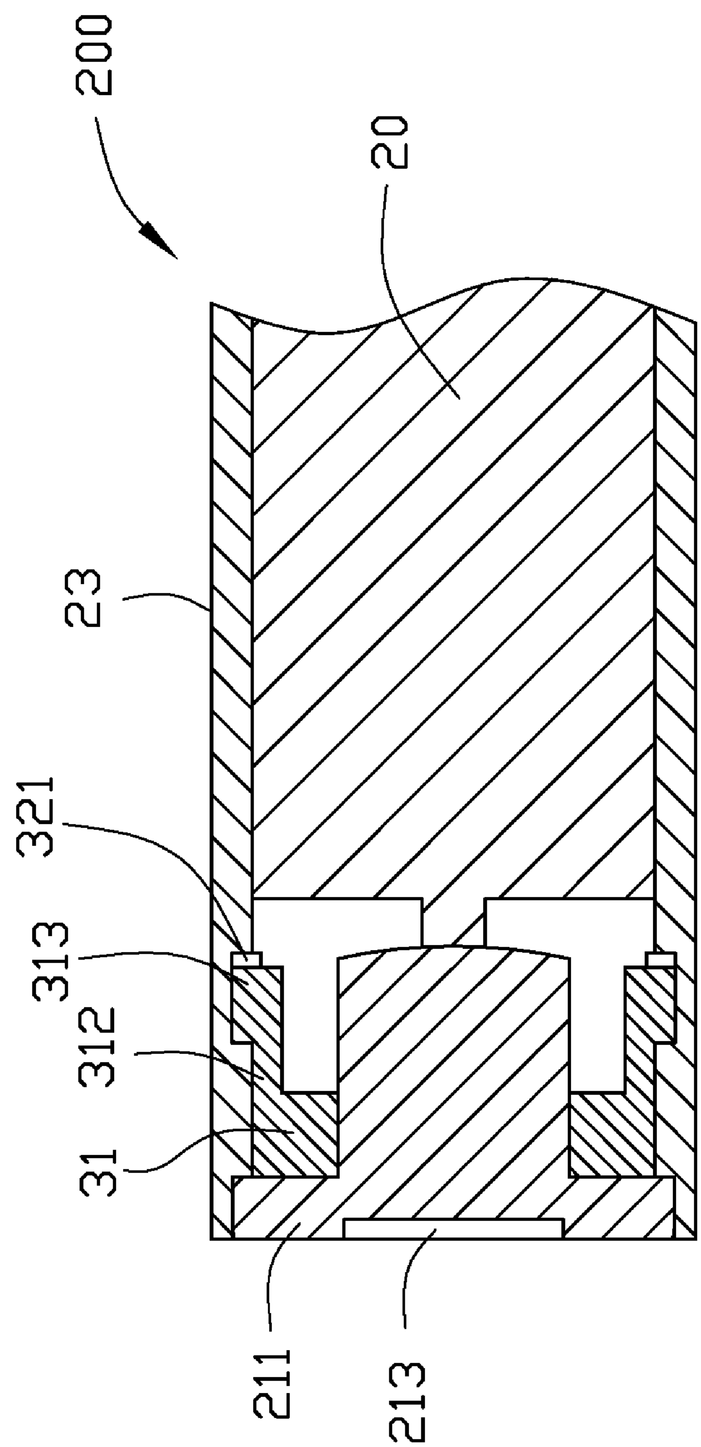
FIG. 3 is a cross-section of the electronic device in FIG. 1, taken along line III-III.

Referring also to FIG. 3, during installation of the battery 20, the battery 20 is received in the chamber 231. The latch portions 312 are deformed elastically by an external force towards the center of the fixing member 31, thus the fixing member 31 can be received in the chamber 231. The positioning protrusion 322 is engaged in the positioning groove 315, each latch protrusion 313 is engaged in the corresponding latch groove 321, and the abutting surfaces 3132 abut the abutting surfaces 3212. The fixing member 31 is thus stably fixed in the sleeve 23. The battery cover 21 fixed to the fixing member 31 is also stably assembled on the sleeve 23. The cover portion 211 engages with the receiving groove 232. The electric portion 212 is received in the through hole 311 of the fixing member 31 and abuts an electrode of the battery 20, such that the battery 20 can provide electrical power to the electronic device 200.

When the battery 20 is to be replaced, a screwdriver can be inserted in the operating slot 213 to rotate the battery cover 21. The fixing member 31 rotates with the battery cover 21, the latch protrusion 313 slides in the corresponding latch groove 321, and the sliding surfaces 3211 abut the sliding surfaces 3131 to bend the latch portions 312 towards the center of the fixing member 31. When the battery cover 21 rotates to a certain angle, the positioning protrusion 322 is disengaged from the positioning groove 315, and the latch protrusions 313 are disengaged from the latch grooves 321. The fixing member 31, together with the battery cover 21, is thus easily removed from the sleeve 23. The battery 20 can be replaced conveniently.

In addition, the fixing member 31 is fixed to the battery cover 21 by the fasteners 25. If the latch portions 312 become damaged due to wear and tear, only the fixing member 31 needs be replaced.

In alternative embodiments, the fixing member 31 may be integrally formed with the battery cover 21, and the fixing member 31 may be omitted, wherein the latch portions 312 are directly formed on the battery cover 21. Also, the number of latch portions 312, latch protrusions 313 and corresponding latch grooves 321 may vary, wherein if there is a plurality of latch protrusions 313 and latch grooves 321, each two adjacent latch protrusions 313 cooperatively define a positioning groove 315 therebetween, and each two adjacent latch grooves 321 cooperatively form a positioning protrusion 322 therebetween. The positioning protrusion 322 then engages with the positioning groove 315, further stably fixing the fixing member 31 in the sleeve 23.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A fixing mechanism for fixing a battery in a sleeve with a battery cover, comprising:

a fixing member fixed to the battery cover, the fixing member forming at least one latch portion, the at least one latch portion forming two latch protrusions thereof and a positioning groove defined between the two latch protrusions; and two latch grooves defined in an inner surface of the sleeve corresponding to the two latch protrusions;

wherein each of the two latch protrusions and each of the two latch grooves both are semi-cylindrical and comprise a sliding surface and two abutting surfaces at opposite ends of the sliding surface; the two latch protrusions engage in or disengage from the two latch grooves such that the fixing member can be fixed in or detached from the sleeve respectively.

2. The fixing mechanism of claim 1, wherein the at least one latch portion is two latch portions, and each latch portion extends substantially parallel to the center axis of the fixing member.

3. The fixing mechanism of claim 1, wherein the sleeve comprises a positioning protrusion formed between the two latch grooves to engage in the positioning groove.

4. An electronic device, comprising:

a sleeve;

a battery received in the sleeve;

a battery cover; and a fixing mechanism to fix the battery in the sleeve with the battery cover, the fixing mechanism comprising:

a fixing member fixed to the battery cover, the fixing member forming at least one elastic latch portion, the at least one latch portion forming two latch protrusions thereof and a positioning groove defined between the two latch protrusions; and two latch grooves defined in an inner surface of the sleeve corresponding to the two latch protrusions;

wherein each of the two latch protrusions and each of the two latch grooves both are semi-cylindrical and comprise a sliding surface and two abutting surfaces at opposite ends of the sliding surface; the two latch protrusions engage in or disengage from the two latch grooves such that the fixing member can be fixed in or detached from the sleeve respectively.

5. The electronic device of claim 4, wherein the battery cover comprises a cover portion, the sleeve defines a receiving groove in an inner surface adjacent to an opening end of the sleeve to receive the cover portion.

6. The electronic device of claim 5, wherein the battery cover comprises an electric portion extending substantially perpendicularly from the cover portion, the fixing member defines a through hole to receive the electric portion.

7. The electronic device of claim 6, wherein the battery cover defines an operating slot in a surface of the cover portion opposite to the electric portion.

8. The electronic device of claim 4, wherein the at least one latch portion is two latch portions, and each latch portion extends substantially parallel to the center axis of the fixing member.

9. The electronic device of claim 4, wherein the sleeve comprises a positioning protrusion formed between the two latch grooves to engage in the positioning groove.

* * * * *